No. 789,439. Patented May 9, 1905.

UNITED STATES PATENT OFFICE.

FLORENTINE J. MACHALSKE, OF BROOKLYN, NEW YORK, ASSIGNOR TO FREDERICK DARLINGTON, OF GREAT BARRINGTON, MASSACHUSETTS.

PROCESS OF TREATING PHOSPHATE-ROCK AND PRODUCING COMPOUNDS OF PHOSPHORUS AND NITROGEN.

SPECIFICATION forming part of Letters Patent No. 789,439, dated May 9, 1905.

Application filed February 25, 1905. Serial No. 247,343.

*To all whom it may concern:*

Be it known that I, FLORENTINE J. MACHALSKE, a citizen of the United States, residing in the borough of Brooklyn, in the county of Kings and State of New York, have invented certain new and useful Improvements in Processes of Treating Phosphate-Rock and Producing Compounds of Phosphorus and Nitrogen, of which the following is a specification.

According to this process rock containing tricalcium phosphate, especially low-grade rock having a phosphate contents of below seventy and down to fifty per cent., is crushed and mixed with an alkali-metal chlorid and carbon. The mixture is smelted at a temperature sufficient to decompose the rock and effect the production of phosphoric chlorid. Nitrogen or air or other gas containing nitrogen is blown through or brought in contact with the charge in the smelting-furnace, and the calcium and sodium combine with carbon and nitrogen to produce cyanamids. The preferred charge consists of a water-free mixture of crushed rock and sodium chlorid and an excess of carbon in the form of broken coke, and the smelting is preferably effected in an electric furnace. The production of the cyanamids is presumably effected in two stages, the first reaction being the production of the carbids, which thereupon combine with nitrogen. The successive reactions may be represented by the following equations:

(1) 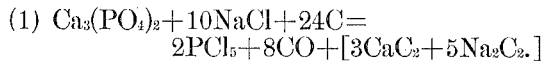
$$Ca_3(PO_4)_2 + 10NaCl + 24C = 2PCl_5 + 8CO + [3CaC_2 + 5Na_2C_2.]$$

(2) 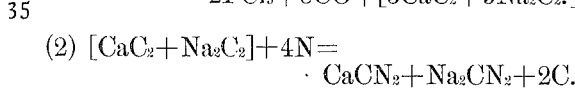
$$[CaC_2 + Na_2C_2] + 4N = CaCN_2 + Na_2CN_2 + 2C.$$

The heating may be effected in an electric furnace either of the arc or resistance type. An electric current, preferably alternating, of from two thousand amperes at fifty volts to two thousand five hundred amperes at forty volts is sufficient for a furnace of the usual size. The resulting phosphoric chlorid is led off from the furnace and may be treated with water for the production of phosphoric and hydrochloric acids. The calcium-sodium cyanamids may be treated with water for the production of calcium and sodium carbonates and ammonia, the reaction being represented by the following equation:

(3) 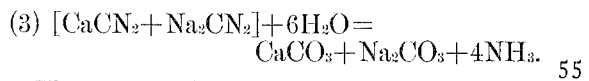
$$[CaCN_2 + Na_2CN_2] + 6H_2O = CaCO_3 + Na_2CO_3 + 4NH_3.$$

The cyanamids may also be mixed with sodium carbonate and smelted in an electric furnace for the production of sodium cyanid, as described in my application, Serial No. 247,344, of even date herewith.

I claim—

1. The process of treating rock containing calcium phosphate, which consists in mixing the rock with an alkali-metal chlorid and carbon, and smelting the mixture at a high temperature in the presence of nitrogen, thereby producing a chlorid of phosphorus and cyanamids of calcium and the alkali metal, as set forth.

2. The process of treating rock containing calcium phosphate, which consists in mixing the rock with sodium chlorid and an excess of carbon, and smelting the mixture at a high temperature in the presence of nitrogen, thereby producing phosphoric chlorid and cyanamids of calcium and sodium, as set forth.

3. The process of treating rock containing calcium phosphate, which consists in mixing the rock with an alkali-metal chlorid and carbon, and electrically smelting the mixture at a high temperature in the presence of nitrogen, thereby producing a chlorid of phosphorus and cyanamids of calcium and the alkali metal, as set forth.

4. The process of treating rock containing calcium phosphate, which consists in mixing the rock with sodium chlorid and an excess of carbon, and electrically smelting the mixture at a high temperature in the presence of nitrogen, thereby producing phosphoric chlorid and cyanamids of calcium and sodium, as set forth.

5. The process of treating rock containing calcium phosphate, which consists in mixing the rock with an alkali-metal chlorid and carbon, smelting the mixture at a high temperature in the presence of nitrogen, thereby producing a chlorid of phosphorus and cyanamids of calcium and the alkali metal, and treating the cyanamids with water, thereby producing ammonia and carbonates of calcium and the alkali metal, as set forth.

In testimony whereof I affix my signature in presence of two witnesses.

FLORENTINE J. MACHALSKE.

Witnesses:
 JNO. B. CAMPBELL,
 WM. P. MITCHELL.